US012658200B2

(12) United States Patent
Biskeborn et al.

(10) Patent No.: US 12,658,200 B2
(45) Date of Patent: Jun. 16, 2026

(54) LOW FRICTION PLANAR SERVO WRITER HEAD

(71) Applicant: Western Digital Technologies, Inc., San Jose, CA (US)

(72) Inventors: Robert G. Biskeborn, San Jose, CA (US); Oscar J. Ruiz, San Jose, CA (US); Trevor W. Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 74 days.

(21) Appl. No.: 18/740,048

(22) Filed: Jun. 11, 2024

(65) Prior Publication Data

US 2025/0378846 A1 Dec. 11, 2025

(51) Int. Cl.
| | |
|---|---|
| *G11B 5/255* | (2006.01) |
| *G11B 5/008* | (2006.01) |
| *G11B 5/187* | (2006.01) |
| *G11B 5/31* | (2006.01) |
| *G11B 15/64* | (2006.01) |

(52) U.S. Cl.
CPC .......... *G11B 5/255* (2013.01); *G11B 5/00813* (2013.01); *G11B 5/1871* (2013.01); *G11B 5/3106* (2013.01); *G11B 5/3116* (2013.01); *G11B 5/3183* (2013.01); *G11B 15/64* (2013.01)

(58) Field of Classification Search
None
See application file for complete search history.

(56) References Cited

U.S. PATENT DOCUMENTS

| | | | |
|---|---|---|---|
| 5,652,015 A | 7/1997 | Aboaf et al. | |
| 7,136,254 B2 | 11/2006 | Nakao et al. | |
| 8,730,615 B1 | 5/2014 | Poorman | |
| 9,570,097 B1 | 2/2017 | Biskeborn et al. | |
| 9,691,414 B1* | 6/2017 | Biskeborn et al. | .. G11B 5/1871 |
| 9,741,367 B1 | 8/2017 | Biskeborn et al. | |
| 10,726,868 B2 | 7/2020 | Biskeborn et al. | |
| 2004/0145827 A1* | 7/2004 | Biskeborn et al. | ........................ |

G11B 5/00813
360/125.35

(Continued)

OTHER PUBLICATIONS

Engelen, J. B. C. et al., Planar Thin-Film Servo Write Head for Magnetic Tape, IEEE Transactions on Magnetics, vol. 48, No. 11, (Nov. 2012), pp. 3539-3542.

(Continued)

*Primary Examiner* — Craig A. Renner
(74) *Attorney, Agent, or Firm* — Patterson + Sheridan, LLP

(57) ABSTRACT

When servo heads in a head chip of a servo write head assembly record servo patterns onto a tape's servo tracks, the servo heads are continuously being rapidly worn away by the tape. This general wear affects the servo heads' ability to record the servo patterns, impairing accurate positioning of the tape heads in the drive. However, by implementing, on the leading edge of the head chip, a support block that has a wear resistant skiving edge and landing zone for the tape "crow bar," which forms when the tape is running over the servo head, the general wear of the servo heads from the tape is mitigated. The skiving edge, which may be formed by thin film technology process steps, causes the tape to fly over the head chip in those regions. An additional support block may be implemented at the trailing edge of the head chip.

20 Claims, 9 Drawing Sheets

(56)     References Cited

U.S. PATENT DOCUMENTS

| | | | | |
|---|---|---|---|---|
| 2005/0052783 | A1* | 3/2005 | Suda | G11B 5/265 360/118 |
| 2005/0122620 | A1* | 6/2005 | Suda | G11B 5/265 360/121 |
| 2005/0254163 | A1* | 11/2005 | Nakao | G11B 5/29 360/48 |
| 2005/0254170 | A1* | 11/2005 | Dugas et al. | G11B 5/3163 360/119.11 |
| 2006/0044671 | A1* | 3/2006 | Weber et al. | G11B 5/584 360/48 |
| 2009/0133468 | A1 | 5/2009 | Biskeborn et al. | |
| 2009/0262456 | A1* | 10/2009 | Dugas | G11B 5/3183 360/110 |
| 2015/0364154 | A1* | 12/2015 | Holmberg et al. | G11B 5/255 360/90 |
| 2017/0236539 | A1* | 8/2017 | Biskeborn et al. | G11B 5/00813 360/122 |

OTHER PUBLICATIONS

Briskeborn, R. et al., Flat-profile tape recording head, IEEE Transactions on Magnetics, vol. 38, No. 5, (Sep. 2002), pp. 1919-1921.

* cited by examiner

LOW FRICTION PLANAR SERVO WRITER HEAD

BACKGROUND OF THE DISCLOSURE

Field of the Disclosure

Embodiments of the present disclosure generally relate to a servo write head for writing servo patterns on a tape.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. In particular, the magnetic write transducer generates a magnetic field, which affects the orientation of the magnetic grains on the magnetic media to encode the data into the magnetic media. Data is read from the media by the magnetic read transducer through sensing of the magnetic field of the magnetic media.

To position the tape head accurately when reading from and writing to a magnetic tape, servo read heads are used to read servo positioning information from servo tracks on the tape. The servo tracks comprising the positioning information are written to the tape once, at the media factory, using servo pattern write heads. When servo write heads are used to record servo position information onto servo tracks on a tape, the heads continuously undergo general wear from being rapidly worn away by the tape. This general wear affects the servo head's ability to record the servo positioning information, thus making accurate positioning of the tape head in a tape drive difficult.

Therefore, there is a need in the art for improved servo write heads of a servo write bar.

SUMMARY OF THE DISCLOSURE

When servo write heads are used to record servo position information onto servo tracks on a tape, the heads continuously undergo general wear from being rapidly worn away by the tape. This general wear affects the servo head's ability to record the servo positioning information, thus making accurate positioning of the tape head in a tape drive difficult. However, by implementing a support block at the leading edge in a tape drive of the servo head chip wherein the support block has a wear resistant skiving edge and landing zone for the tape, which forms when the tape is running over the servo head, the general wear of the servo head from the tape is mitigated. The skiving edge may have thin film technology processed steps which cause the tape to fly over the head in those regions. An additional support block may be implemented at the trailing edge of the chip.

In one embodiment, a servo write bar, including a head chip comprising one or more servo write heads; a film structure disposed on a media facing surface of the head chip, wherein a plurality of servo patterns of the one or more servo write heads are disposed on an outward facing surface of the film structure; and at least one support block disposed adjacent to the head chip, the film structure and the at least one support block forming a planar media facing surface, wherein the at least one support block is configured to entrain air between a tape traversing the planar media facing surface.

In another embodiment, a servo write bar, including a head chip comprising one or more servo write heads; a film structure disposed on a media facing surface of the head chip, wherein a plurality of servo patterns of the one or more servo write heads are disposed on an outward-facing surface of the film structure; at least one support block disposed at a leading edge of the head chip, the film structure and the at least one support block forming a planar media facing surface; and a skiving edge formed into the at least one support block, wherein the skiving edge is configured to entrain air between a tape traversing the planar media facing surface.

In yet another embodiment, a servo write bar, including means to write a servo pattern on a tape, including a head chip comprising one or more servo write heads; a film disposed on a media facing surface of the head chip, wherein a plurality of servo patterns of the one or more servo write heads are disposed on an outward-facing surface of the film; at least one support block disposed at a leading edge of the head chip, the film and the at least one support block forming a planar media facing surface; and a means for entraining air between a tape traversing the planar media facing surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the FIGS. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

When servo heads in a head chip of a servo write head assembly record servo patterns onto a tape's servo tracks, the servo heads are continuously being rapidly worn away by the tape. This general wear affects the servo heads' ability to record the servo patterns, impairing accurate positioning of the tape heads in the drive. However, by implementing, on the leading edge of the head chip, a support block that has a wear resistant skiving edge and landing zone for the tape "crow bar," which forms when the tape is running over the servo head, the general wear of the servo heads from the tape is mitigated. The skiving edge, which may be formed by thin film technology process steps, causes the tape to fly over the head chip in those regions. An additional support block may be implemented at the trailing edge of the head chip.

Figure 1A:
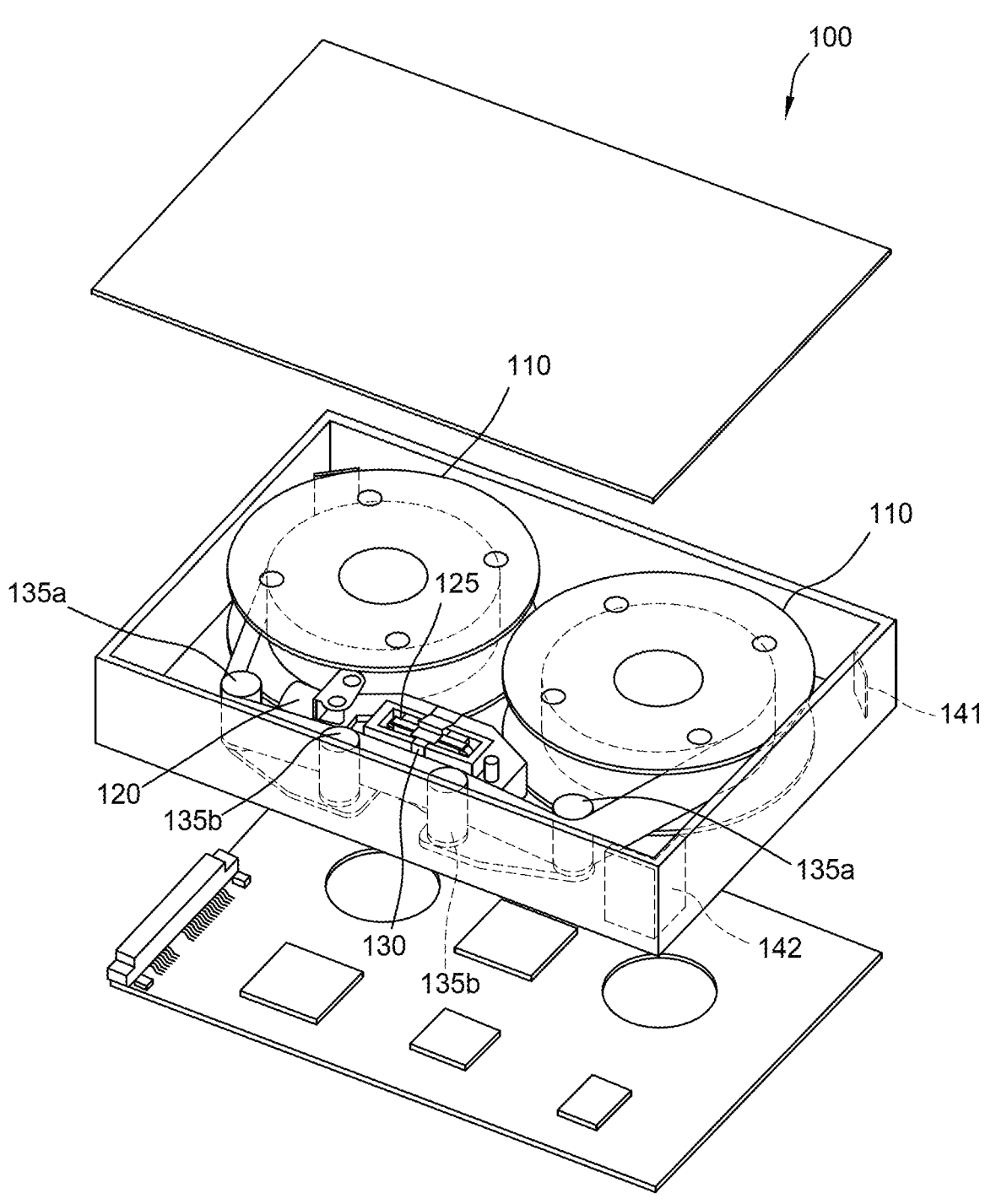
FIGS. 1A-1C illustrate a perspective exploded view, a simplified top down, and side profile view of a tape drive, in accordance with one or more embodiments.
Figure 1B:
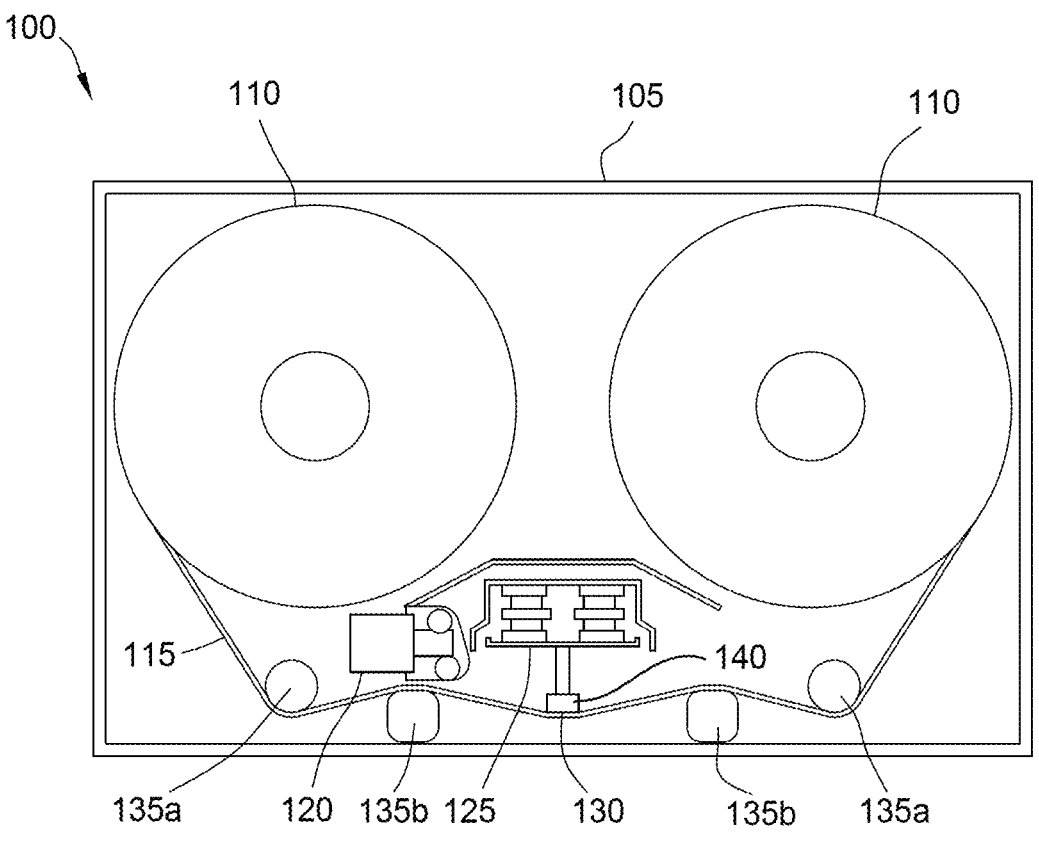
Figure 1C:
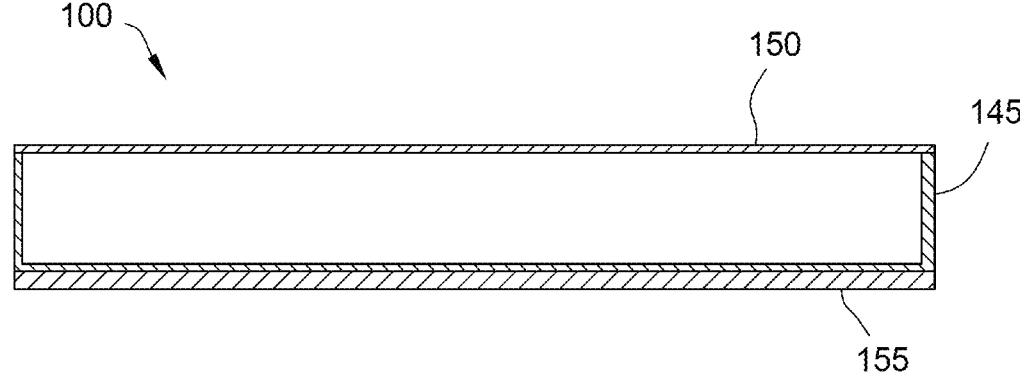

FIGS. 1A-1C illustrate a perspective exploded view, a simplified top down, and side profile view of a tape drive 100, showing a use environment of a tape whose servo tracks are written by a servo head in accordance with some embodiments. The tape drive 100 may be a captive tape drive or a tape embedded drive (TED), or a tape drive that can acceptable a tape cartridge (e.g., LTO). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film (e.g., a film structure) moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be not hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
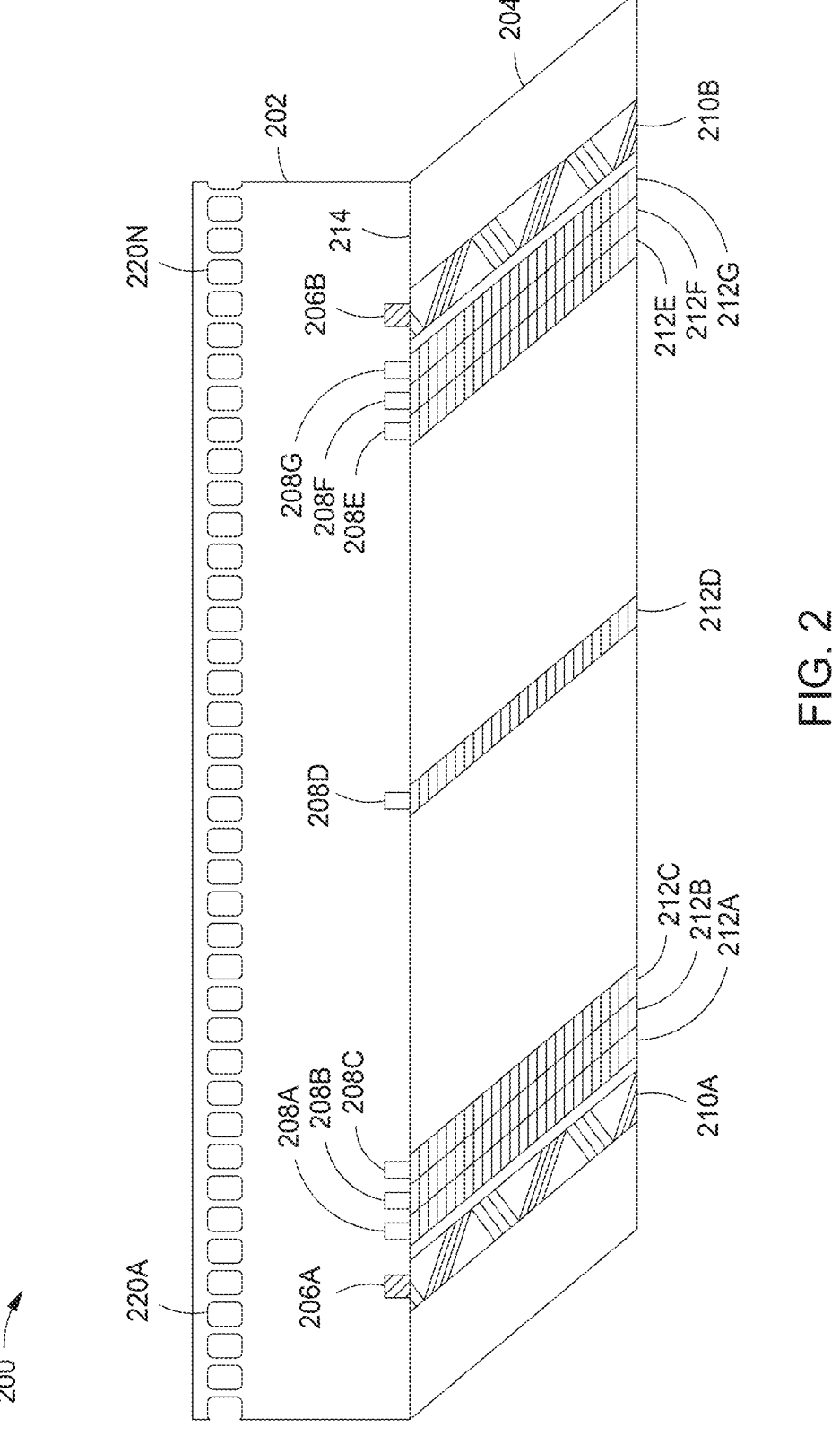
FIG. 2 is a schematic illustration of a tape head and tape that are aligned, in accordance with one or more embodiments.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N are electrically coupled to the tape head body 202. The plurality of pads 220A-220N coupled to the tape head body 202 are not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head module 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
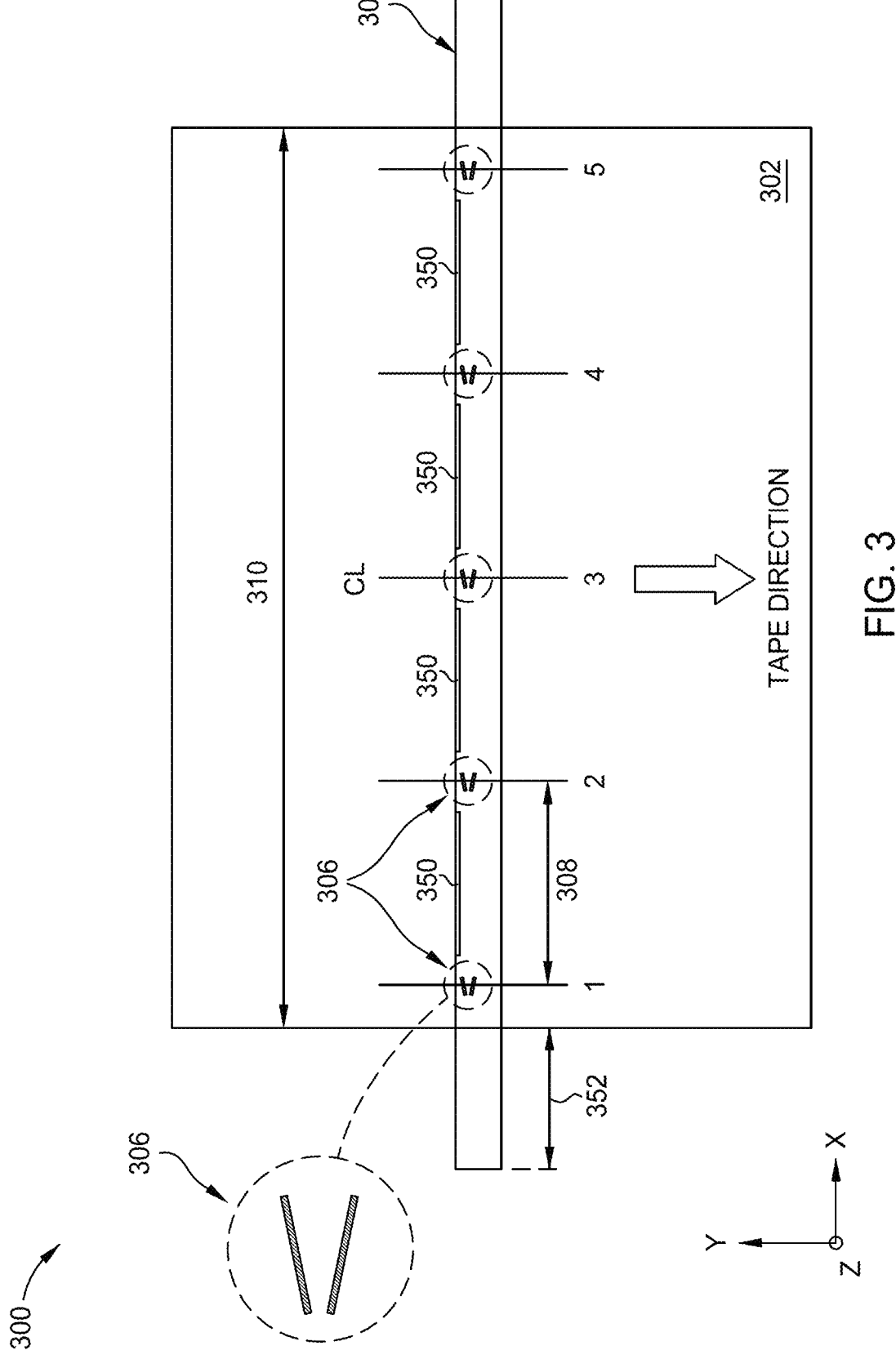
FIG. 3 illustrates a servo write bar disposed over a tape, in accordance with one or more embodiments.

FIG. 3 is a top view of a servo write head assembly 300, in accordance with one or more embodiments. The servo write bar 304 may be used to write the first servo track 210A and the second servo track 210B of FIG. 2. In some embodiments, and as described in further detail below in FIGS. 5A-B and 6, a support block (not shown) is disposed adjacent to the servo write bar 304.

The servo write bar 304 comprises a plurality of servo writing elements (servo heads) for writing servo patterns onto the tape 302. As used herein, the term "servo patterns" refers to such write elements when describing the servo write bar or the servo write head assembly (servo patterns 306 in this figure), as well as the written patterns on the servo tracks, when describing the tape. A first servo pattern (1) 306 is disposed at a first edge of the tape 302, the third servo pattern (3) 306 is disposed on a centerline (CL) of the tape 302, and a fifth servo pattern (5) 306 is disposed at a second edge of the tape 302 opposite the first edge. The second servo pattern (2) 306 is disposed halfway between the first and third servo patterns 306, and the fourth servo pattern (4) is disposed halfway between the third and fifth servo patterns 306. While five servo patterns 306 are shown, the servo write bar 304 may comprise any number of servo patterns 306. Each servo pattern 306 is disposed on a servo write head, like shown and described below in FIGS. 5A-5B.

Each servo pattern 306 comprises chevron line pairs disposed at an angle of about 12° to about 24°. Each servo pattern 306 is spaced a distance 308 in the x-direction from an adjacent servo pattern 306 by about 2,850 microns to about 2,865 microns (μm), such as about 2,858 microns. The tape 302 has a width 310 in the x-direction (i.e., perpendicular to a direction of tape movement) of about 12,650 microns. The servo write bar 304 has a length in the x-direction greater than the width of the tape 302 by about 4,000 microns. For example, the servo write bar 304 has a length of about 16,600 microns to about 16,700 microns. As shown, the servo write bar 304 may be centered over the tape 302. In some embodiments, the servo write bar 304 may be longer to accommodate servo writing at an angle, and further enables a large pitch between heads. In certain embodiments, skiving eliminating features 350 (discussed in further detail below in FIGS. 5A-B and 6), such as notches, tapers, or steps, may be implemented within distance 308 and spaced in-between and/or confined to the spaces between the intervals of the servo patterns 306. In certain embodiments, the distance 352 between an edge of the tape 302 and a head bar of the servo write bar 304 is about 2000 microns.

Figure 4:
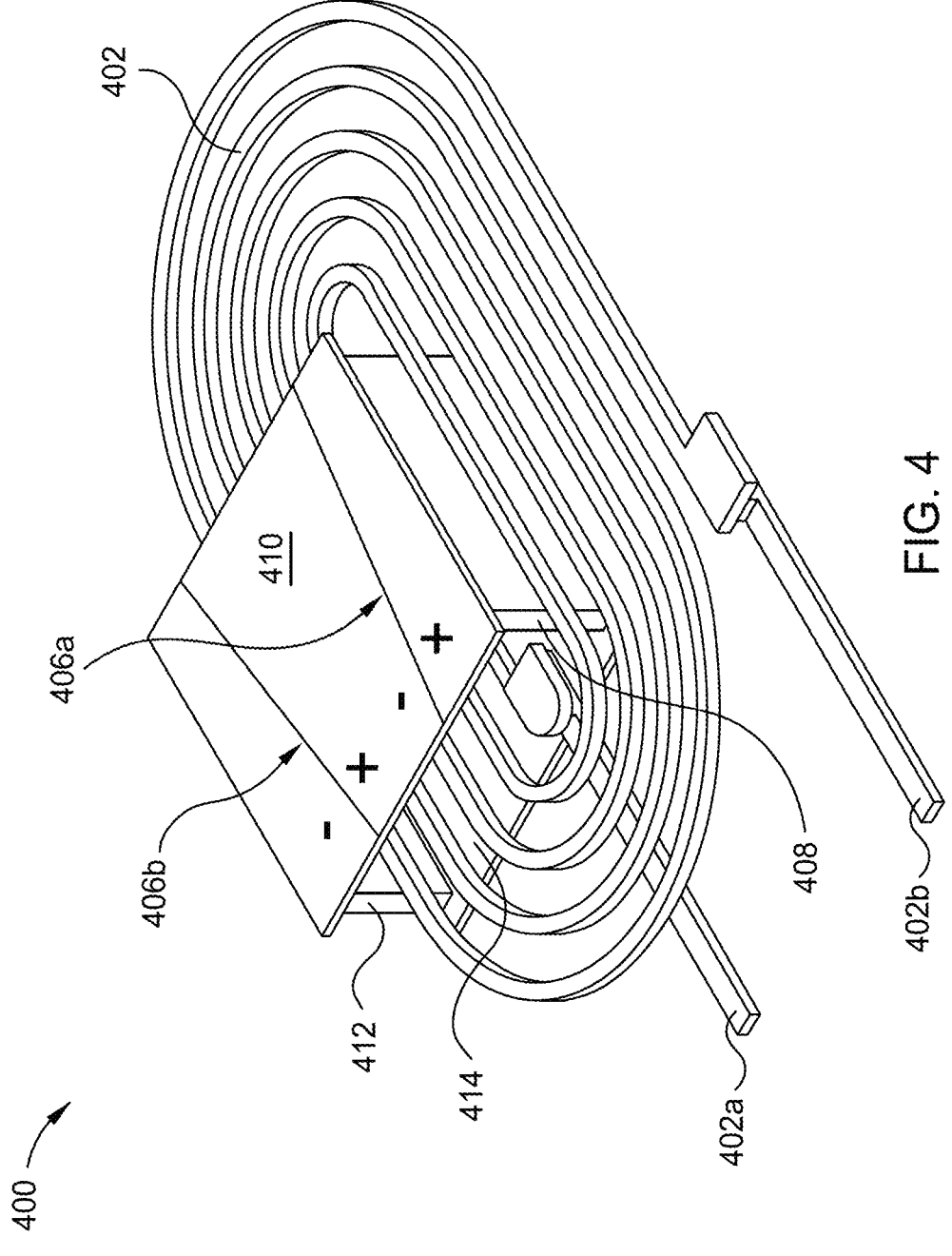
FIG. 4 illustrates a conventional servo write head, in accordance with one or more embodiments.

FIG. 4 illustrates a servo write head 400, in accordance with one or more embodiments. As shown in FIG. 4, the servo write head 400 comprises a magnetic yoke structure, and further comprises a first side pole 408, a top surface 410, a second side pole 412 opposite the first side pole 408, and a bottom surface 414 opposite the top surface 410. A first servo line 406a and a second servo line 406b are disposed on the top surface 410, forming a servo pattern 406. The first and second servo lines 406a, 406b are non-magnetic gaps (e.g., slits) in the top surface 410. During writing, magnetic flux extends outwards to imprint the servo pattern on the media. A coil 402 is wrapped around the first side pole 408. In some embodiments, coil 402 is a multi-turn coil. In some embodiments, the multi-turn coil may have eight (8) or more turns. Increasing the amount of turns in the coil enables faster current switching and writing at higher tape speeds. Coil 402 comprises two leads 402a and 402b. The two leads 402a, 402b connect to electrically conducting leads, which are fabricated in a film (e.g., film 512 of FIG. 5) below the tape bearing surface, and which extends to the chip side (or sides), where leads 402a, 402b are exposed at the tape facing surface away from the tape. When in use, leads 402a, 402b connect to electrical pads that are connected to a servo writer current driver (e.g., similar to how a plurality of pads 220A-220N of FIG. 2 are electrically coupled to the tape head body 202 in a tape head used in a tape drive).

To imprint or write the servo pattern 406 on a tape, current pulses are applied to the coil 402 to generate magnetic flux. As the current pulses, the magnetic flux travels from the first side pole 408, across the top surface 410, down the second side pole 412, and across a bottom surface 414. The magnetic flux traveling across the top surface 410 imprints the servo pattern 406 on a tape.

Figure 5A:
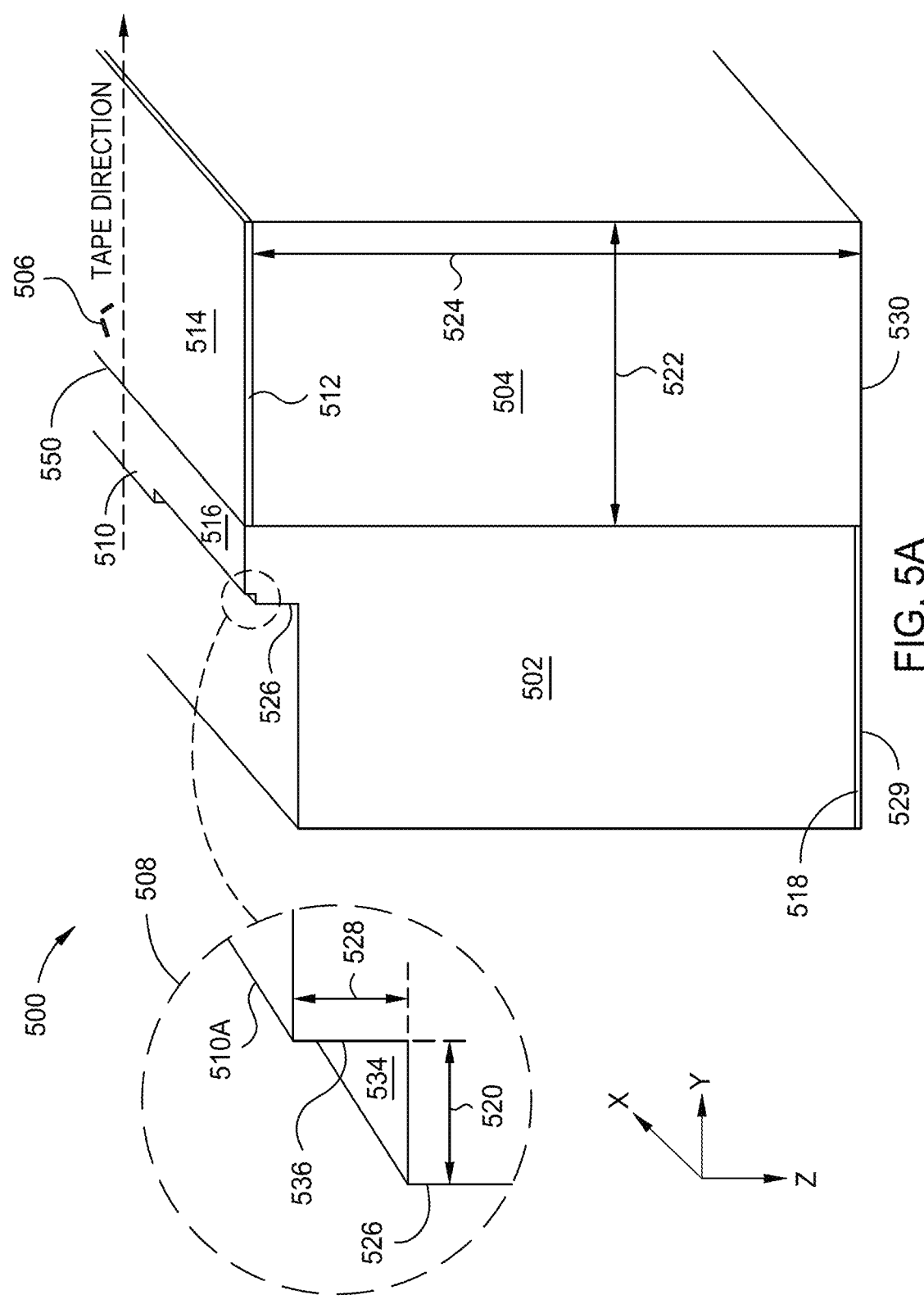
FIGS. 5A-5B show a side cross-sectional view and a top down, side profile view of a servo write head, in accordance with one or more embodiments.
Figure 5B:
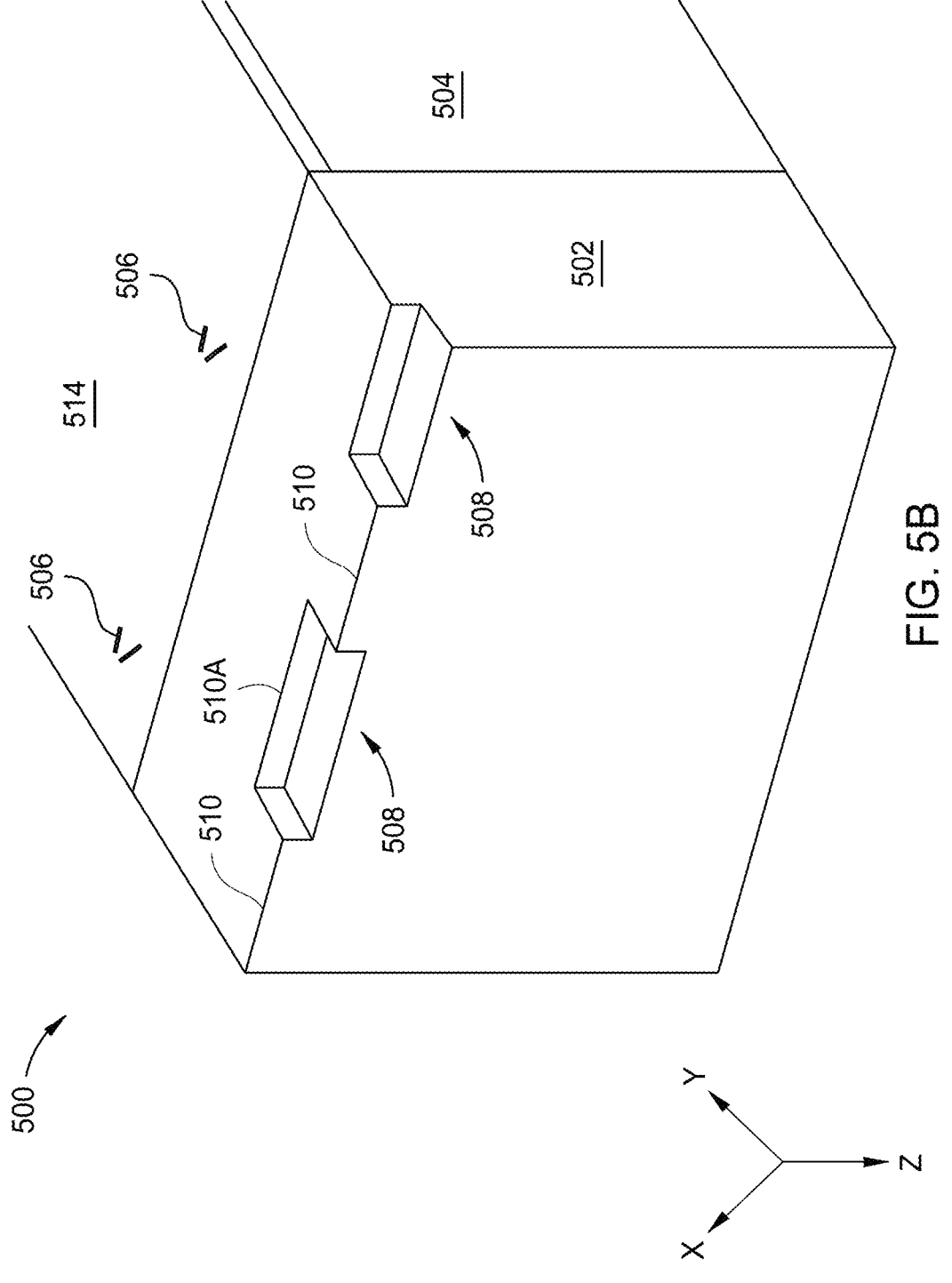

FIG. 5A shows a side cross-sectional view of a servo write head assembly 500, in accordance with one or more embodiments. As shown in FIGS. 5A-5B, servo write head assembly 500 comprises a head chip 504 and a support block 502 disposed along a leading edge 550 and over a surface of the head chip 504. The servo write head assembly 500 may comprise or be a part of the servo write bar 304 of FIG. 3. For example, the top surfaces of the head chip 504 and the support block 502 may collectively form the servo write bar 304. The servo write head assembly 500 may further comprise one or more servo write heads 400 of FIG. 4. FIG. 5B shows a top down, side profile view of the servo write head assembly 500, in accordance with certain embodiments.

The fully processed head chip 504 is diced from a wafer secured to a fixture (not shown), such as a micrometer head, or other positioning devices having datums for locating into a servo writer tape path. Head chip 504 may have a height 524 between a range of about 1200 microns and about 1220 microns, such as 1210 microns. For example, in accordance with present day HDD recording head wafer dimension, head chip 504 may also have a width 522 between a range of about 200 microns and about 700 microns, such as 600 microns. In some embodiments, the support block 502 and/or head chip 504 comprise alumina titanium carbide (AlTiC). In some embodiments, film 512 comprises sputtered amorphous aluminum oxide (AlO). In some embodiments, film 512 has a thickness between about 8 microns to about 16 microns. In certain embodiments, the film 512 comprises of thin film processed servo write transducers (e.g., servo write head(s) 400 of FIG. 4). Each servo pattern (such as servo patterns 306 of FIG. 3) is disposed on a servo write head and comprises a chevron line pair 506. As shown in FIG. 5A, the chevron line pair 506 of a servo pattern may be implementations of servo lines (e.g., servo lines 406a, 406b of FIG. 4) and are disposed at a first media facing surface (MFS) 514 such as an air bearing surface (ABS) of the head chip 504 of the servo write head assembly 500. While one chevron line pair 506 is shown in FIG. 5A, the servo patterns disposed at the first MFS 514 of the head chip 504 may comprise any number of chevron pairs, such as five, or more (e.g., nine) or fewer (e.g., three). During writing, magnetic flux extends outwards from chevron line pair 506 to imprint the servo pattern on the media.

Support block 502 comprises a second MFS 516 and skiving edge 510. The second MFS 516 and skiving edge 510 of the support block 502 are formed by quad slotting a wafer, patterning 508 (optional) of the skiving edge 510, and then aligning and bonding (e.g., via adhesive epoxy) the wafer to the head chip 504. Finally, a taperless grind is applied to the wafer. Though the support block 502 is disposed along a leading edge 550 and over a surface of the head chip 504, the second MFS 516 of the support block 502 is aligned with the first MFS 514 of the head chip 504. That is, the leading edge 550 where the first and second MFSs 514, 516 meet does not create a step, and the first and second MFSs 514, 516 are flush with each other. As such, the first MFS 514 and the second MFS 516 collectively form one uniform or planar MFS. In some embodiments, the misalignment between the first and second MFSs 514, 516 is no greater than 100 nanometers (nm).

Optional patterning 508 may be implemented along the skiving edge 510, e.g., skiving eliminating feature(s) 510A may be implemented along the skiving edge 510 and is formed by a second vertical wall 536 and second MFS 516. The optional patterning 508, e.g., skiving eliminating feature(s) 510A, may be spaced at intervals along the skiving edge 510. In some embodiments, due to the optional patterning 508 or spacing of the patterning 508, the skiving edge 510 is formed by the first vertical wall 526 and the second MFS 516. The optional patterning 508 spaced at intervals along the skiving edge 510 may be depressions along the skiving edge 510 and are formed by a second vertical wall 536 and lip 534, the lip 534 formed by the first vertical wall 526. In some embodiments, patterning 508 is stepped or notch-like. An example of optional patterning 508 along the skiving edge 510 is described in a co-pending patent application titled "Reduction Of High Tape Contact Pressure Points Against Head Assembly," U.S. application Ser. No. 17/991,620, filed Nov. 21, 2022, assigned to the same assignee of this application, which is herein incorporated by reference. In some embodiments, the patterning 508 has a ratio of depth or width in the x-direction (e.g., depth or width 520) to height in the y-direction (e.g., height 528) between about 0.01 and about 0.2. The ratio of depth or width to height describes the ratio of patterning 508, being for example a step-like and/or notch-like, disposed along the skiving edge 510.

In some embodiments, the second vertical wall 536 has a height 528 between about 5 microns and about 25 microns. In some embodiments, the lip 534 has a depth or width 520 of about 20 microns and about 100 microns, such as 100 microns. While patterning 508 is shown as formed by the second vertical wall 536 and lip 534, it is contemplated that the shape of patterning 508 may also be tapered or sloped pattern. In some embodiments, the patterning 508 is spaced in-between and/or confined to the spaces between the intervals of chevron pairs (e.g., chevron pair 506) of the servo pattern (such as servo pattern 306 of FIG. 3). In other words, the patterning 508 may be disposed on either side of the chevron pairs 506 such that the patterning 508 is not disposed directly adjacent to the chevron pairs 506. In some embodiments, the patterning 508 is spaced apart at intervals between about 2 millimeters (mm) and about 3 mm, such as about 2.8 mm, along the skiving edge 510 and in-between chevrons pair 506.

By utilizing the support block 502 and patterning in-between and/or confining the patterning to spaces between the servo patterns, there is reduced friction between the tape and the servo write head chip, as well as a minimization of velocity variation during servo writing. Further, by patterning 508 the skiving edge 510 of the support block 502 in such a manner, a vacuuming effect which pulls the tape and film 512 together when the tape travels across the first MFS 514 is mitigated. While this vacuuming effect may provide suitable contact between the tape and film 512 for recording servo position information, such contact exacerbates the rate of wear on film 512 and the servo write heads. Moreover, without support block 502, as the tape travels across the first MFS 514, the tape contacts the edge of film 512 resulting in wearing of the film (described further in FIGS. 7A-7B). By implementing a support block 502 ahead of the tape direction and/or travel path to the head chip 504, skiving eliminating feature(s) 510A and patterning 508 entrain air (e.g., via aerodynamics caused by skiving eliminating feature(s) 510A and patterning 508) between the tape and the second MFS 516. As a result, the entrained air lifts the tape and causes the tape to fly over the servo writer heads in those regions and mitigates wear on film 512 caused from the vacuuming effect and edge contact.

In some embodiments, the support block 502 can be a copy of the head chip 504 flipped up-side down but mirrored to ensure both the support block 502 and head chip 504 have the same dimensions for better alignment. For example, the support block 502 is fabricated in a similar manner as head chip 504, such that the support block 502 mirrors the head chip 504 and a film 518 (similar to film 512) may be disposed on a bottom surface of the support block 502. The second MFS 516 and skiving edge 510 of the support block 502 are then formed on a top surface of the support block 502 opposing the bottom surface of the support block 502 that film 518 is disposed on by the above-mentioned process. The support block 502 is then oriented such that the out-ward-facing surface 529 of the second film 518 of the support block 502 and bottom surface 530 of the head chip 504 are flush with each other and the first and second MFSs 514, 516 are flush with each other.

Figure 6:
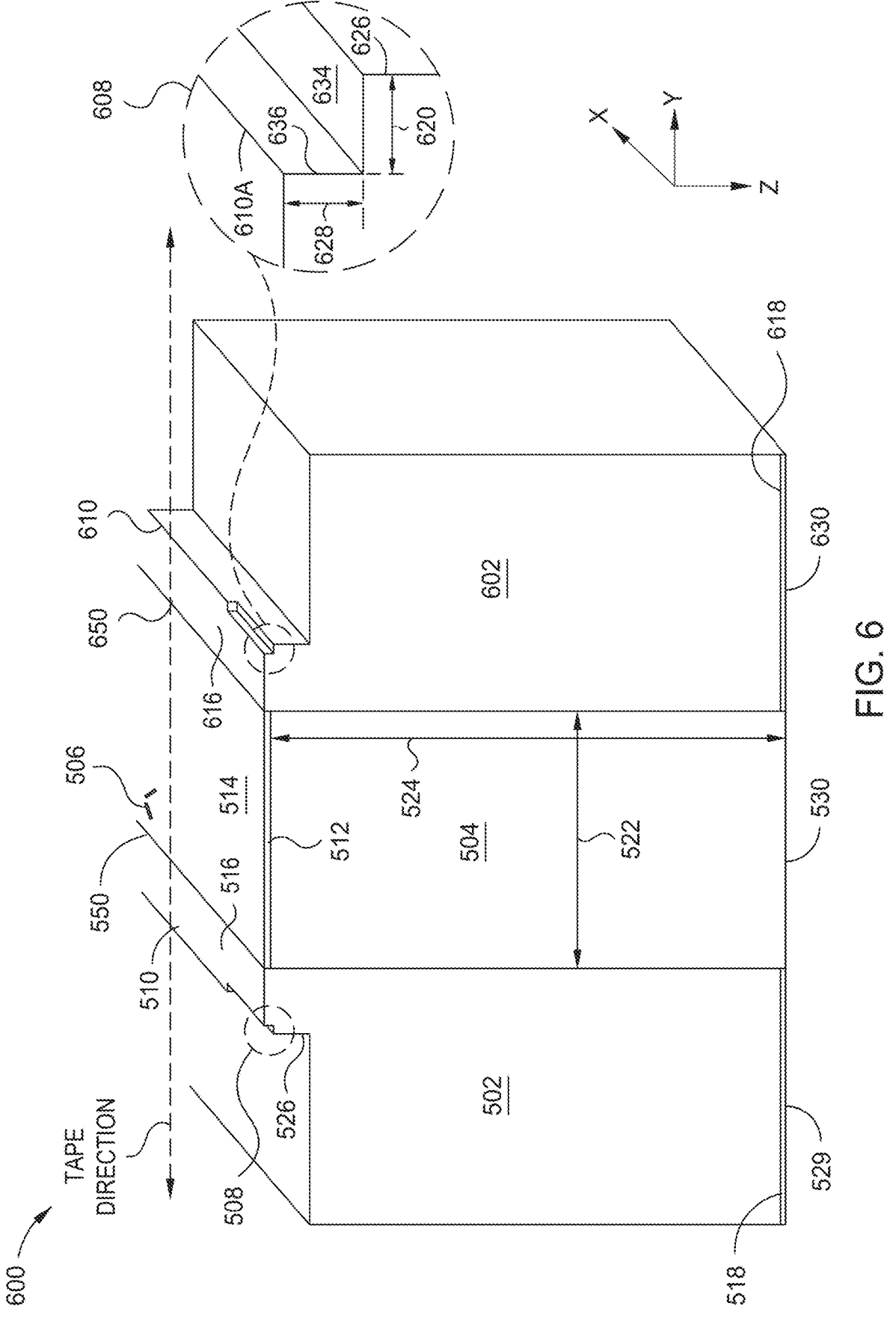
FIG. 6 shows a side cross-sectional view of a servo write head, in accordance with one or more embodiments.

FIG. 6 shows a side cross-sectional view of a servo write head assembly 600, in accordance with one or more embodiments. The servo write head assembly 500 may comprise or be a part of the servo write bar 304 of FIG. 3. For example, the top surfaces of the head chip 504 and the support block

502 may collectively form the servo write bar 304. The servo write head assembly 500 may further comprise one or more servo write heads 400 of FIG. 4. As shown in FIG. 6, servo write head assembly 600 comprises the head chip 504 and the support block 502 disposed along a leading edge 550 and over a surface of the head chip 504 (such as in FIG. 6), and a second support block 602 disposed along a trailing edge 650 of the head chip 504 and over a surface of the head chip 504 that opposes the surface of the head chip 504 that support block 502 is bonded to.

Second support block 602 comprises a third MFS 616 and skiving edge 610. The third MFS 616 and skiving edge 610 of the second support block 602 are formed by quad slotting a wafer, patterning 608 (optional) along the skiving edge 610, and then aligning and bonding (e.g. via adhesive epoxy) the wafer to the head chip 504; finally, a taperless grind is applied to the wafer. Though the second support block 602 is disposed along a trailing edge 650 and over a surface of the head chip 504, the third MFS 616 of the second support block 602 is aligned with the first MFS 514 of the head chip 504. That is, the trailing edge 650 where the first and third MFSs 514, 616 meet does not create a step and the first and third MFSs 514, 616 are flush with each other. In some embodiments, the misalignment between the first and third MFSs 514, 616 is no greater than 100 nanometers (nm).

Optional patterning 608 may be implemented along the skiving edge 610, e.g., skiving eliminating feature(s) 610A may be implemented along the skiving edge 610 and is formed by a fourth vertical wall 636 and third MFS 616. The optional patterning 608, e.g., skiving eliminating feature(s) 610A, may be spaced at intervals along the skiving edge 610. In some embodiments, due to the optional patterning 608 or spacing of the patterning 608, the skiving edge 610 is formed by the third vertical wall 626 and the third MFS 616. The optional patterning 608 spaced at intervals along the skiving edge 610 may be depressions along the skiving edge 610 and is formed by the fourth vertical wall 636 and second lip 634, the second lip 634 formed by the third vertical wall 626. In some embodiments, the patterning 608 has a ratio of depth or width in the x-direction (e.g., depth or width 620) to height in the y-direction (e.g., height 628) between about 0.01 and about 0.2. The ratio of depth or width to height describes the ratio of patterning 608, being for example a step-like and/or notch-like, disposed along the skiving edge 610.

In some embodiments, the fourth vertical wall 636 has a height 628 between about 5 microns and about 25 microns. In some embodiments, the depth or width 620 of the second lip 634 is between about 20 microns and about 100 microns, such as 100 microns. While patterning 608 is shown to comprise of a fourth vertical wall 636, second lip 634, and skiving eliminating feature(s) 610A, it is contemplated that the shape of the patterning 608 may also be tapered or sloped. In some embodiments, the patterning 608 is spaced in-between and/or confined to the spaces between the intervals of chevron pairs (e.g. chevron pair 506) of the servo pattern (such as servo pattern 306 of FIG. 3). In some embodiments, the patterning 608 is spaced apart at intervals between about 2 millimeters (mm) and about 3 mm, such as about 2.8 mm, along the skiving edge 610 and in-between chevrons pairs.

In some embodiments, the tape may travel bi-direction-ally over the servo write head assembly 600. This forward and reverse travel of the tape in both directions across the first, second, and third MFSs 514, 516, 616 allows for the servo write head assembly 600 to record servo position information as well as perform a rewind/reverse function. In similar function to support block 502 of FIG. 5, when the servo write head assembly 600 travels in the reverse direction (e.g. first over the third MFS 616 then over the first MFS 514), the skiving edge 610 and patterning 608 of the second support block 602 entrains air (e.g. via aerodynamics caused by patterning 608) between the tape and the third MFS 616 as the tape travels in reverse towards the head chip 504. As a result, the entrained air lifts the tape and causes the tape to fly over the servo writer head in those regions and mitigates wear on film 512 caused from the vacuuming effect and edge contact between the tape and film 512. In some embodiments, the second support block 602 may be patterned across the entire width of skiving edge 610, in which case there is no skiving in that direction.

In some embodiments, the second support block 602 can be a copy of the head chip 504 flipped up-side down but mirrored to ensure both the second support block 602 and head chip 504 have the same dimensions for better alignment. For example, the second support block 602 is fabricated in a similar manner as head chip 504, such that the second support block 602 mirrors the head chip 504 and a film 618 (similar to film 512) is disposed on a bottom surface of the second support block 602. The third MFS 616 and skiving edge 610 of the second support block 602 are then formed on a surface opposing the surface of the second support block 602 that film 618 is disposed on by the above-mentioned process. The second support block 602 is then oriented (e.g. flipped over) such that the outward-facing surface 630 of the second film 618 of the second support block 602 and bottom surface 530 of the head chip 504 are flush with each other and the first and third MFSs 514, 616 are flush with each other.

Figures 7A, 7B:
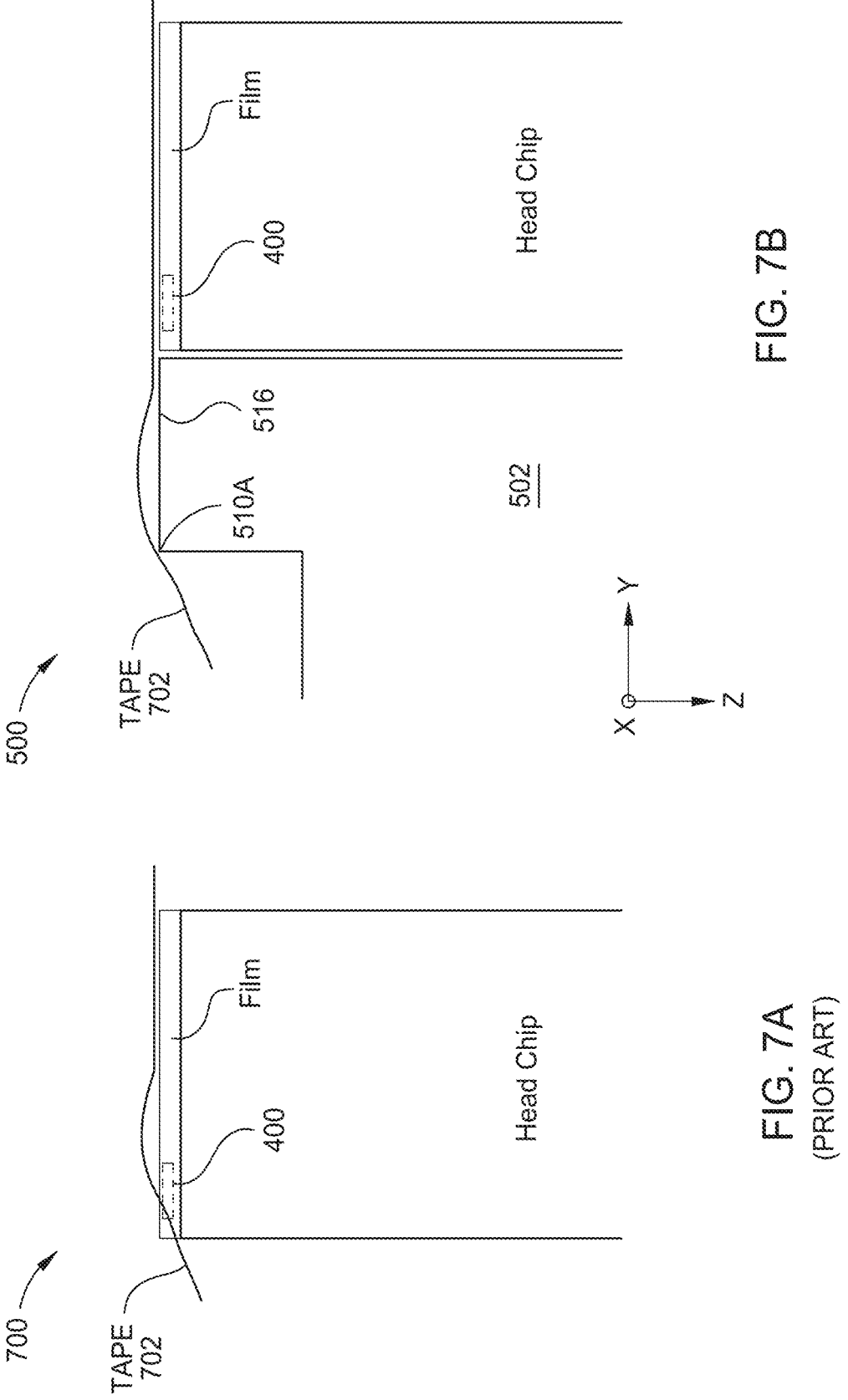
FIGS. 7A-7B show a side cross-sectional view of servo write heads, in accordance with one or more embodiments.

FIGS. 7A-7B show a side cross-sectional view of servo write heads, in accordance with one or more embodiments. The use of a support block, skiving edge, and—in some embodiments—patterning of the skiving edge (e.g., the skiving eliminating feature(s)) as previously described in FIGS. 5A-B and 6, mitigates wear on the film disposed on the head chip by entraining air between the tape 702 and MFS of the support block as the tape 702 travels over the head chip. As shown in FIG. 7A (prior art), as the tape 702 travels over a servo write head assembly 700 having no support block, the tape 702 contacts the edge of the film (e.g., a thin film processed servo write transducers, such as servo write heads 400 of FIG. 4 which comprises a magnetic yoke structure) which results in the general wearing of the film. As shown in FIG. 7B, as an example, servo write head assembly 500 comprises a support block 502 bonded to a top surface of the head chip. As the tape 702 travels over support block 502 and the film of the head chip (e.g., film 512 of FIG. 5) the skiving eliminating feature(s) 510A formed along a skiving edge 510 may entrain air between the tape 702 and the second MFS 516 before contacting the film, thereby mitigating contact between the tape 702 and the edge of the film. In some embodiments, the tape 702 has a width between about 5 microns to about 15 microns, such as between about 5 microns and about 10 microns.

Unlike in conventional servo writer heads, in some embodiments of the present disclosure, the MFS is parallel to the surface of the wafer forming the head chip and/or support blocks. This further contributes to a low wear rate and longer head life of the servo write head (e.g., greater than 10 million meters of tape run).

By implementing a support block ahead of the tape direction and/or travel path to the head chip, skiving edge and patterning of the skiving edge entrain air between the tape and the MFS of the support block. As a result, the entrained air lifts the tape and causes the tape to fly over the servo writer heads in those regions and mitigates wear on film caused from the vacuuming effect and edge contact.

In one embodiment, a servo write bar, including a head chip comprising one or more servo write heads; a film structure disposed on a media facing surface of the head chip, wherein a plurality of servo patterns of the one or more servo write heads are disposed on an outward facing surface of the film structure; and at least one support block disposed adjacent to the head chip, the film structure and the at least one support block forming a planar media facing surface, wherein the at least one support block is configured to entrain air between a tape traversing the planar media facing surface.

The at least one support block comprises alumina titanium carbide (AlTiC). A skiving edge is formed into the at least one support block. A plurality of depressions are disposed along the skiving edge, and the plurality of depressions are configured to entrain air between the tape traversing the planar media facing surface. The plurality of depressions are disposed at intervals along the skiving edge based on the plurality of servo patterns. The film structure has a thickness between 8 microns to 16 microns. The at least one support block is disposed at a leading edge of the head chip. A second film structure is disposed on a bottom surface of the support block. An outward-facing surface of the second film structure is flush with a bottom surface of the head chip. A second support block of the at least one support blocks, wherein the second support block is disposed on a trailing surface of the head chip, wherein each support block is disposed on opposing surfaces of the head chip.

In another embodiment, a servo write bar, including a head chip comprising one or more servo write heads; a film structure disposed on a media facing surface of the head chip, wherein a plurality of servo patterns of the one or more servo write heads are disposed on an outward-facing surface of the film structure; at least one support block disposed at a leading edge of the head chip, the film structure and the at least one support block forming a planar media facing surface; and a skiving edge formed into the at least one support block, wherein the skiving edge is configured to entrain air between a tape traversing the planar media facing surface.

The film structure comprises amorphous aluminum oxide (AlO) and the at least one support block comprises alumina titanium carbide (AlTiC). A plurality of depressions are disposed at equal intervals along the skiving edge, and the plurality of depressions are configured to entrain air between the tape traversing the planar media facing surface. The plurality of depressions are disposed along the skiving edge based on the plurality of servo patterns. The plurality of depressions are tapered or sloped in shape. A width of the plurality of depressions is between 20 microns and 100 microns. A height of the plurality of depressions is between 5 microns and 25 microns. A second film structure is disposed over a bottom surface of the at least one support block, and an outward-facing surface of the second film structure is flush with a bottom surface of the head chip.

In yet another embodiment, a servo write bar, including means to write a servo pattern on a tape, including a head chip comprising one or more servo write heads; a film disposed on a media facing surface of the head chip, wherein a plurality of servo patterns of the one or more servo write heads are disposed on an outward-facing surface of the film; at least one support block disposed at a leading edge of the head chip, the film and the at least one support block forming a planar media facing surface; and a means for entraining air between a tape traversing the planar media facing surface.

The means for entraining air is formed into the at least one support block.

While the foregoing is directed to embodiments of the present disclosure, other and further embodiments of the disclosure may be devised without departing from the basic scope thereof, and the scope thereof is determined by the claims that follow.

What is claimed is:

1. A device for writing servo patterns on a magnetic tape, comprising:
   a head chip comprising one or more servo write heads;
   a first film structure disposed on a media facing surface of the head chip, wherein a plurality of servo patterns of the one or more servo write heads are disposed on an outward facing surface of the first film structure;
   at least one support block disposed adjacent to the head chip, the first film structure and the at least one support block forming a planar media facing surface, wherein the at least one support block is configured to entrain air between a tape traversing the planar media facing surface and the first film structure; and
   a second film structure disposed on a bottom surface of the support block.

2. The device for writing servo patterns on the magnetic tape of claim 1, wherein the at least one support block comprises alumina titanium carbide (AlTiC).

3. The device for writing servo patterns on the magnetic tape of claim 1, wherein a skiving edge is formed into the at least one support block.

4. The device for writing servo patterns on the magnetic tape of claim 3, wherein a plurality of depressions are disposed along the skiving edge, and the plurality of depressions are configured to entrain air between the tape traversing the planar media facing surface and the first film structure.

5. The device for writing servo patterns on the magnetic tape of claim 4, wherein the plurality of depressions are disposed at intervals along the skiving edge based on the plurality of servo patterns.

6. The device for writing servo patterns on the magnetic tape of claim 1, wherein the first film structure has a thickness between 8 microns to 16 microns.

7. The device for writing servo patterns on the magnetic tape of claim 1, wherein the at least one support block is disposed at a leading edge of the head chip.

8. The device for writing servo patterns on the magnetic tape of claim 1, wherein an outward-facing surface of the second film structure is flush with a bottom surface of the head chip.

9. The device for writing servo patterns on the magnetic tape of claim 1, further comprising a second support block of the at least one support block, wherein the second support block is disposed on a trailing surface of the head chip, wherein each support block is disposed on opposing surfaces of the head chip.

10. A servo write bar, comprising:
    a head chip comprising one or more servo write heads;
    a first film structure disposed on a media facing surface of the head chip, wherein a plurality of servo patterns of the one or more servo write heads are disposed on an outward-facing surface of the first film structure;
    at least one support block disposed at a leading edge of the head chip, the first film structure and the at least one support block forming a planar media facing surface;
    a skiving edge formed into the at least one support block; and
    a second film structure disposed on a bottom surface of the support block.

11. The servo write bar of claim 10, wherein the first film structure comprises amorphous aluminum oxide (AIO) and the at least one support block comprises alumina titanium carbide (AlTiC).

12. The servo write bar of claim 10, wherein a plurality of depressions are disposed at equal intervals along the skiving edge, and the plurality of depressions are configured to entrain air between a tape traversing a planar media facing surface and the first film structure.

13. The servo write bar of claim 12, wherein the plurality of depressions are disposed along the skiving edge based on the plurality of servo patterns.

14. The servo write bar of claim 12, wherein the plurality of depressions are tapered or sloped in shape.

15. The servo write bar of claim 12, wherein a width of the plurality of depressions is between 20 microns and 100 microns.

16. The servo write bar of claim 12, wherein a height of the plurality of depressions is between 5 microns and 25 microns.

17. The servo write bar of claim 10, wherein an outward-facing surface of the second film structure is flush with a bottom surface of the head chip.

18. A servo write bar, comprising:
    means to write a servo pattern on a tape, comprising:
       a first head chip comprising one or more servo write heads;
       a first film disposed on a media facing surface of the first head chip, wherein a plurality of servo patterns of the one or more servo write heads are disposed on an outward-facing surface of the first film;
       at least one support block disposed at a leading edge of the first head chip, the first film and the at least one support block forming a planar media facing surface;
       wherein a second film is disposed on a bottom surface of the at least one support block opposing the planar media facing surface; and
       a means for entraining air between a tape traversing the planar media facing surface and the first film.

19. The servo write bar of claim 18, wherein the means for entraining air is formed into the at least one support block.

20. The servo write bar of claim 18, wherein the at least one support block is a second head chip, and wherein the second film is disposed on the second head chip opposing the planar media facing surface.

* * * * *